United States Patent [19]
Franklin et al.

[11] Patent Number: 5,302,823
[45] Date of Patent: Apr. 12, 1994

[54] SATELLITE SOLAR BAND CALIBRATION SOURCE TARGET APPARATUS

[75] Inventors: William M. Franklin; Alan D. Bell; Richard V. Annable, all of Fort Wayne, Ind.

[73] Assignee: ITT Corporation, New York, N.Y.

[21] Appl. No.: 937,646

[22] Filed: Aug. 31, 1992

[51] Int. Cl.⁵ .............................. G01D 18/00
[52] U.S. Cl. ........................ 250/252.1; 250/353
[58] Field of Search ........... 250/252.1 A, 353, 504 R, 250/495.1; 359/864, 853, 627, 351

[56] References Cited

U.S. PATENT DOCUMENTS 4,724,329  2/1988  Doyle et al. ............ 250/504 R
4,801,202  1/1989  Wilcox ..................... 356/152

FOREIGN PATENT DOCUMENTS 03-115816  5/1991  Japan ...................... 250/252.1 A
1257412    9/1986  U.S.S.R. ................. 250/252.1 A
2059041    4/1981  United Kingdom ...... 359/351

Primary Examiner—Constantine Hannaher
Attorney, Agent, or Firm—Arthur L. Plevy; Patrick M. Hogan

[57] ABSTRACT

The present invention is an off-axis collimator used to monitor the optoelectronic performance of a radiometer, which off-axis collimator is comprised of a single off-axis paraboloidal mirror, a broadband radiant energy source housed in an integrating sphere, detectors for monitoring the performance of the broadband radiant energy source, and a housing for the collimator.

22 Claims, 3 Drawing Sheets

SATELLITE SOLAR BAND CALIBRATION SOURCE TARGET APPARATUS

FIELD OF THE INVENTION

The present invention relates to collimators and more particularly to a collimator utilizing a broadband radiant energy source and an off-axis paraboloidal mirror to monitor the optoelectronic performance of a radiometer.

BACKGROUND OF THE INVENTION

A radiometer is a device for measuring the radiation from a radiant energy source. See U.S. Pat. No. 4,801,202 entitled METHOD AND APPARATUS FOR RADIOMETER STAR SENSING issued on Jan. 31, 1989 to J. E. Wilcox and assigned to ITT Aerospace Optical. The invention described therein relates to a system for orienting earth scanning radiometer instruments by employing the instruments themselves to take star sightings to determine the exact optical axis of the instruments.

Conventional radiometers consist of an objective lens or mirror which collects radiation from a source and images it directly onto the surface of a detector capable of converting the incident radiation into an electrical signal.

To photograph images from either a polar or a geosynchronous orbit, conventional photoreconnaissance satellites utilize a radiometer having a scan mirror and a telescope. The scan mirror which looks out into space from the satellite platform, rotates to scan and thus attains an image of the radiant energy source of interest. The scan mirror reflects this radiant energy onto the telescopic mirrors of the radiometer. This radiant energy, which is then converted into an electrical signal, is recorded in data processors on board the satellite and can be relayed to controllers at ground stations on earth.

Collimators are optical devices which convert a diverging or converging beam of light into a collimated or parallel beam. Conventional collimators are used to monitor the optoelectronic performance of radiometers used in photoreconnaissance satellites by beam expanding and collimating radiant energy of a known intensity from either a laser or a blackbody source onto the scan mirror which then reflects this radiant energy onto the telescopic mirrors of the radiometer. The image formed by this radiant energy source is then recorded in data processors, enabling controllers at a ground station on earth to compare the most recently recorded images to previously recorded images and thus detect any problems with the optoelectronic performance of the radiometer. If any aberrations are found in the most recently recorded images, as compared to previously recorded images, the controllers can correct any such aberrations by using well known digital image processing techniques. Collimators are well known in the art. Examples of such devices are found in chapter 14.4 of a text by W. J. Smith entitled *Modern Optical Engineering*, which was published by McGraw-Hill in 1966.

Two shortcomings of conventional collimaters are that: they are designed and built with n consideration given to the size and weight constraints associated with satellite applications; and they do not include a means for monitoring the stability and accuracy of the radiant energy source.

A final disadvantage of conventional collimators is that they utilize an externally mounted sliding cover over the output aperture of the housing for the collimator. As the cover is externally mounted, it is therefore not flush with the housing and can, being in the field of the view of the scan mirror, cause vignetting of the image that is then reflected by the scan mirror onto the telescopic mirrors of the radiometer.

It is an object of this invention to provide a collimator which is smaller and lighter than conventional collimators and therefore more adaptable for satellite applications. The present invention accomplishes this by utilizing a single off-axis reflective mirror rather than the multiple on-axis mirrors used in conventional collimators.

It is a further object of this invention to provide an off-axis collimator which utilizes a broadband radiant energy source to monitor the optoelectronic performance of the radiometer.

It is also an object of this invention to provide an off-axis collimator which includes radiant energy detectors to monitor the optoelectronic performance of the radiant energy source.

Another objective of this invention is to provide a housing for an off-axis collimator which utilizes an inner rotating door to open and close the output aperture of the housing and thus minimize the volume of this off-axis collimator assembly.

SUMMARY OF THE INVENTION

The present invention is an off-axis collimator used to periodically monitor the optoelectronic performance of a radiometer, which off-axis collimator is comprised of a single off-axis paraboloidal mirror, a broadband radiant energy source housed in an integrating sphere, means for monitoring the performance of the broadband radiant energy source and a housing for the collimator. The collimator housing utilizes an inner rotating door to open and close the output aperture of the housing through which radiant energy is reflected by the off-axis paraboloidal mirror onto the radiometer.

BRIEF DESCRIPTION OF THE DRAWINGS

FIG. shows an exemplary embodiment of the off-axis collimator which is the object of this invention.

DETAILED DESCRIPTION OF THE FIGURES

Figure 1:
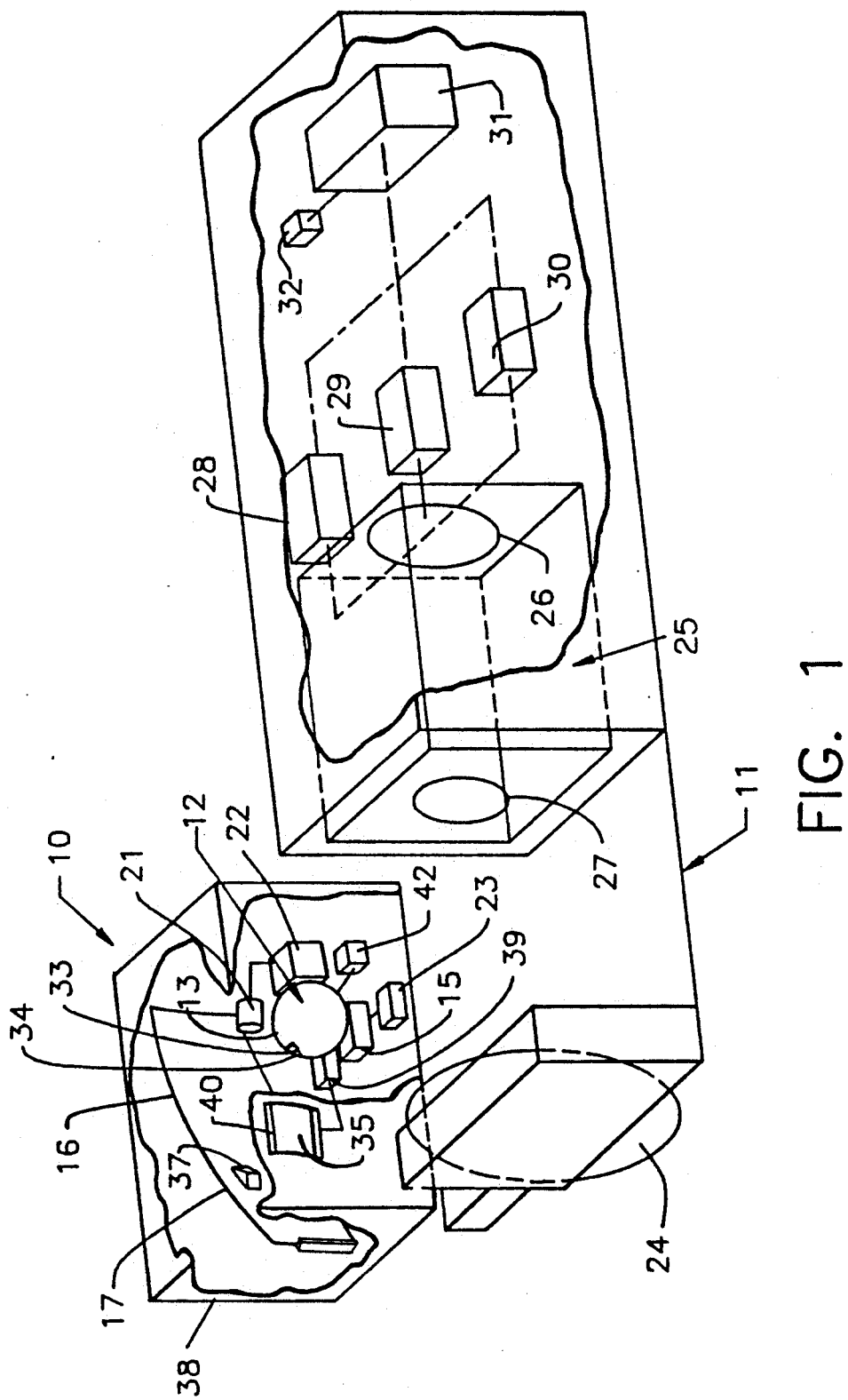

Referring to FIG. 1 there is shown the Satellite Solar Band Calibration Source Target (SSBCST) 10 which is a stable, accurate light source/calibration target used to periodically monitor the optoelectronic performance of a radiometer 11 used in a photoreconnaissance satellite. The SSBCST 10, which is a subassembly of the radiometer 11, is an off-axis collimator of light in the solar spectral band, i.e. 0.4–3.0 um.

The SSBCST 10 includes: a radiant energy source 12 comprised of an integrating sphere 13 housing four broadband high-intensity light sources 14, e.g. tungsten halogen quartz bulbs, (FIG. 2); a microprocessor controller 15 for controlling the radiant energy source 12;

an off-axis paraboloidal mirror 16; a reflective flat surface 17 affixed at the optical center of the off-axis paraboloidal mirror 16; three radiant energy detectors 18, 19 and 20 (FIG. 3) able to detect radiant energy at three different bandwidths in the visible-near infrared spectrum; a common housing 21 for the three radiant energy detectors 18, 19 and 20, which housing 21 is positioned adjacent to the integrating sphere 13; data processors 22; and a power supply 23.

The radiometer 11 includes a scan mirror 24, a telescope 25 having a primary mirror 26 and a secondary mirror 27, three visible-near infrared spectral channels 28, 29 and 30; data processors 31; and a power supply 32. The radiometer 11 is positioned adjacent to the SSBCST 10. The SSBCST 10 enables controllers on earth to monitor the optoelectronic performance of the radiometer's three spectral channels 28, 29 and 30 on a periodic, e.g. weekly, basis over the projected lifetime of the satellite's mission. The SSBCST 10 does this by periodically focusing collimated emissions of radiant energy of known intensity onto the radiometer 11, which emissions are recorded in the data processors 31, thereby enabling controllers at ground stations on earth to compare the most recently recorded emissions to previously recorded emissions and thus check the optoelectronic performance of the radiometer 11. The SSBCST 10 thus provides an optical input to output radiance calibration over the entire solar spectral band of the three spectral channels 28, 29 and 30 of the radiometer.

The four broadband high-intensity light sources 14 are positioned through the shell of the integrating sphere 13, which integrating sphere 13 is of a certain diameter, e.g. 4 inches (10.24 cm). The broadband high-intensity light sources 14 emit a high spectral radiance output at three bandwidths, e.g. 610 nm, 870 nm and 1.6 um, corresponding to the three visible-near infrared spectral channels of the radiometer 28, 29 and 30. Use of the broadband high-intensity light sources 14 in the integrating sphere 13 permits the SSBCST 10 to cover the full dynamic range of each of these three spectral channels 28, 29 and 30 during periodic checks of the optoelectronic performance of the radiometer 11.

Conventional collimators use either a laser or a blackbody as the radiant energy source. Both of these types of sources have drawbacks as compared to the broadband high-intensity light sources used in the present invention. Lasers are monochromatic and are therefore unable to emit the spectral radiance levels required to monitor the optoelectronic performance of the three spectral channels 28, 29 and 30 of the radiometer 11. Although blackbody sources are able to emit the spectral radiance levels required to monitor the optoelectronic performance of the radiometer 11, they can only do so by operating at high temperatures. Consequently, these high operating temperatures necessitate extensive cooling of the blackbody source which burdens the power supply 23 of the collimator.

The output aperture 33 of the integrating sphere 13 is positioned at the focus 34 of the off-axis paraboloidal mirror 16. A diameter, e.g. 0.25 inches (0.64 cm) is chosen for the output aperture 33 in order to simulate a point source to the off-axis paraboloidal mirror 16. The diameter of this output aperture 33 is chosen to provide enough angular extent to overfill the instantaneous field of view of the radiometer 11.

Radiant energy emitted through the output aperture 33 of the integrating sphere 13 is reflected by the off-axis paraboloidal mirror 16, through the output aperture 35 of the SSBCST 10, onto the scan mirror 24 which reflects this radiant energy onto the telescopic mirrors 26 and 27 of the radiometer 11. The integrating sphere 13 is placed at the focus 34 of the off-axis paraboloidal mirror 16 s that the radiant energy emitted from the integrating sphere 13 is collimated by the off-axis paraboloidal mirror 16 before being reflected onto the radiometer 11. The dimensions of the off-axis paraboloidal mirror 16 are selected to minimize the width of the SSBCST 10 assembly so that the image formed by the radiant energy reflected onto the. radiometer 11 from the SSBCST 10 is equal in width to the scan mirror dimensions. Because of the relatively short distance between the SSBCST 10 and the radiometer 11, optical aberrations such as coma and astigmatism that cause an angular blur in the image reflected by the off-axis paraboloidal mirror 16 will be relatively minor and will therefore not adversely affect the performance of the SSBCST 10.

A reflective flat surface 17, having the same reflective qualities as the off-axis paraboloidal mirror 16 is positioned at the optical center of the off-axis paraboloidal mirror 16. A beam which passes through the focal point of a parabola and is directed towards the center of the parabola is reflected upon itself. By being positioned at the center of the off-axis paraboloidal mirror 16 the reflective flat surface 17 is therefore able to reflect a small fraction, e.g. 1.6%, of the output beam from the integrating sphere 13 onto the three radiant energy detectors 18, 19 and 20, thereby enabling controllers on earth to periodically monitor the stability and accuracy of the radiant energy source 12. Each one of these three radiant energy detectors 18, 19 and 20 detects radiant energy at a different one of the three bandwidths over which the four broadband high-intensity light sources 14 emit radiant energy.

Because the secondary mirror 27 of the telescope 25 has a blind zone of a certain diameter, e.g. 2 in. (5.12 cm), and of a certain area, e.g. 3.14 in.$^2$(20.3 cm$^2$), and because the back of this secondary mirror 27 faces towards the scan mirror 24 and the SSBCST 10, there is a blind zone of identical area and diameter at the center of the off-axis paraboloidal mirror 16. Accordingly, as long as the reflective flat surface 17 is of a smaller diameter and a smaller area than this blind zone, the placement of the reflective flat surface 17 at the center of the off-axis paraboloidal mirror 16 will not interfere with the image reflected by the SSBCST 10 onto the radiometer 11.

The side 36 of the reflective flat surface 17 facing the output aperture 35 of the SSBCST 10 can be machined for alignment reference such that the corner edges are parallel to the output aperture 35. The side 37 of the reflective flat surface 17 facing back towards the integrating sphere 13 has an outward beveled surface, e.g. of 5°, from parallel to the vertex focal length and a high polished flat finish, e.g. of λ/8. The angle chosen for the beveled surface, e.g. 5°, allows the housing 21 for the three radiant energy detectors 18, 19 and 20 to be positioned adjacent to the integrating sphere 13. This placement of the reference detectors 18, 19 and 20 minimizes the overall size requirements of the SSBCST 10.

The stability and accuracy of the output of the SSBCST 10 is monitored, e.g. to better than 2% error, by the three radiant energy detectors 18, 19 and 20. The output of the SSBCST 10, which is calibrated on the ground in laboratory tests prior to the satellite's launch, provides a stable and accurate source of radiant energy to the three visible-near infrared spectral channels 28, 29 and 30 of the radiometer. A redundant set of detectors can be installed to insure that the SSBCST 10 can continue to be monitored if the primary set fails during the mission.

A housing 38 for the SSBCST 10 is positioned adjacent to the scan mirror 24. When the SSBCST 10 is to be used, ground controllers instruct a motor 39, e.g. a stepper motor which is well known in the art, and which is conventionally coupled to an inner rotating door 40, to rotate the inner rotating door 40 from a closed position to an open position thereby opening the output aperture 35 of the SSBCST 10. Alternatively, the motor 39 can be automatically activated by a microprocessor controller. At the same time, the radiant energy source 12 is automatically activated by the microprocessor controller 15. The radiant energy source 12 could, alternatively, be activated by manual command from ground controllers. The SSBCST 10 thus emits collimated radiant energy through the output aperture 35 onto the scan mirror 24, which reflects this collimated radiant energy into the telescope 25 of the radiometer 11.

Figure 2:
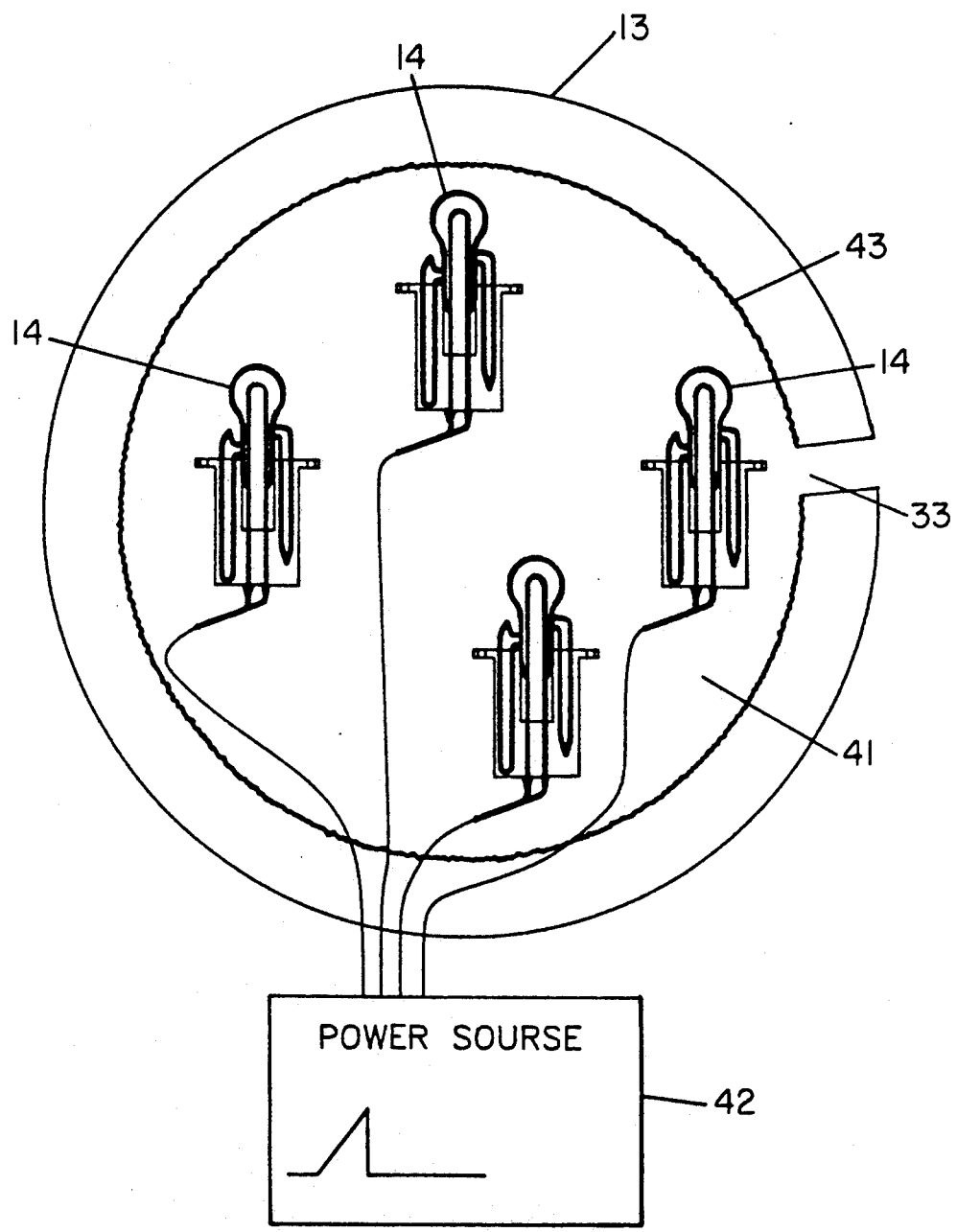
FIG. 2 shows an integrating sphere with a source of light radiation positioned within the hollow of the integrating sphere, and a power generator coupled to the integrating sphere.

FIG. 2 is a cross-sectional view showing four high intensity light sources 14 positioned within the hollow 41 of the integrating sphere. A power supply 42 (POWER SOURCE), e.g. a voltage ramp generator which is well known in the art, is employed as the power source for the light sources 14. The repetition rate and amplitude of the ramp can be varied or modified to alter the radiance levels of the light sources 14 to the integrating sphere 13 and can be used to control the output spectral radiance levels of the broadband high-intensity light sources 14. Power supply 42 is the preferred embodiment of the power supply 23 shown in FIG. 1.

The integrating sphere 13 is coated internally with a reflective material 43, e.g. SPECTRALON, which offers a high reflectance that exceeds 99% through the three respective spectral channels 28, 29 and 30 of the radiometer 11. This reflective coating 43 produces a stable, uniform output emitted through the output aperture 33 of the integrating sphere 13.

Figure 3:
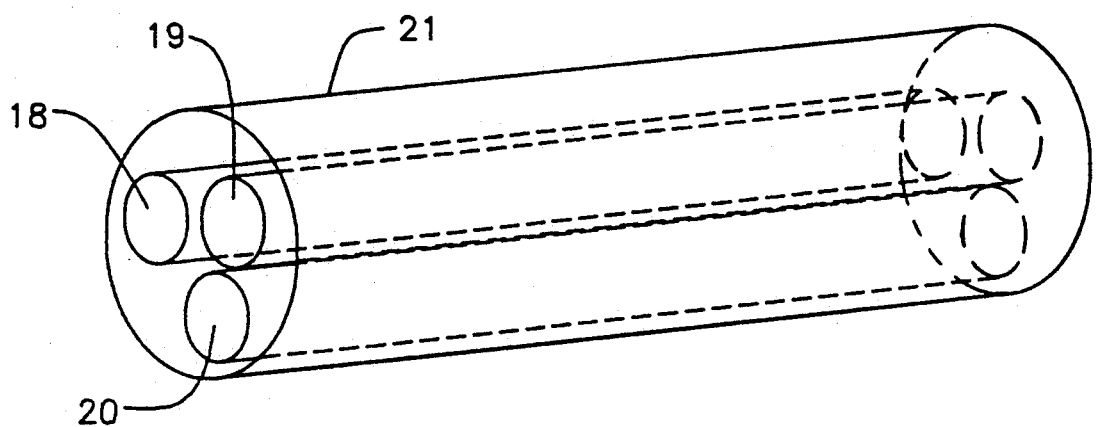
FIG. 3 shows three radiant energy detectors positioned within the hollow of a common housing.

FIG. 3 shows the radiant energy detectors 18, 19 and 20 inside of the common housing 21 for these detectors.

Figure 4:
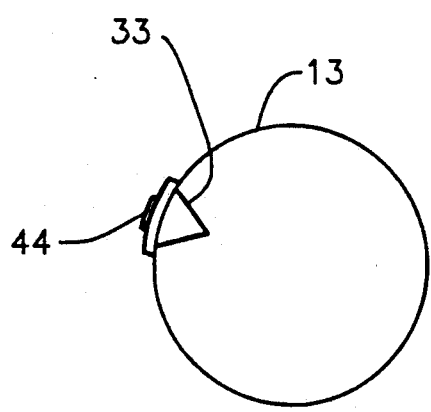
FIG. 4 shows an integrating sphere with a filter set over the output aperture.

FIG. 4 shows the integrating sphere 13 with a filter set 44 over the output aperture 33. The filter set 44 can be used to control the output spectral radiance level of the integrating sphere 13.

It will be understood that the embodiment described herein, including the number of light sources in the integrating sphere, the number of radiant energy detectors and the dimensions given for the various components, is merely exemplary and that a person skilled in the art may make many variations and modifications to the described embodiment utilizing functionally equivalent elements to those described. Any variations or modifications to the invention just described are intended to be included within the scope of said invention as defined by the appended claims.

We claim:

1. In an electrooptical apparatus, having an optical element, wherein said electrooptical device detects radiant energy in different frequency bands each of a separate bandwidth caused to impinge upon said optical element and produces an electrical signal output corresponding to the radiant energy detected, a device for calibrating the performance of said electrooptical apparatus, comprising:

a radiant energy source for emitting radiant energy within said different frequency bands;

a plurality of detectors for detecting said radiant energy, wherein each of said detectors detects a single frequency band contained within said different frequency bands emitted by said radiant energy source, thereby quantifying the emissions of said radiant energy source in each of the frequency bands, said plurality of detectors being positioned in an unobstructed relationship with said radiant energy source to receive said different frequency bands in an unobstructed and unaltered condition; and collimator means for collimating said radiant energy and directing the collimated radiant energy onto said optical element, whereby the electrical signal output created by said electrooptical apparatus in response to said radiant energy is indicative of the performance of said electrooptical apparatus as compared to a predetermined output expected for the radiant energy detected by said plurality of detectors.

2. The device according to claim 1, wherein said electrooptical device detects radiant energy in three distinct frequency bands, said radiant energy source emits radiant energy in three distinct frequency bands and said plurality of detectors include three detectors that detect said radiant energy in the three distinct frequency bands.

3. The device according to claim 1, wherein said collimator means includes a reflector surface having a curved region that collimates and directs said radiant energy onto said optical element and a flat region that reflects said radiant energy onto said plurality of detectors.

4. The device according to claim 3, wherein said curved region of said reflector surface is paraboloidal in shape.

5. The device according to claim 4, wherein said flat region of said reflector surface is disposed within the parabolodial shaped curved region.

6. The device according to claim 1, wherein said radiant energy source includes at least one high-intensity incandescent bulb.

7. The device according to claim 6, wherein said at least one incandescent bulb is disposed within an integrating sphere having a reflective interior surface and at least one output aperture.

8. The device according to claim 6, wherein said at least one high-intensity incandescent bulb includes a tungsten halogen quartz bulb.

9. The device according to claim 1, further including a selectively closable aperture disposed between said optical element and said collimator means, whereby said closable aperture can selectively isolate said collimator means from said optical element.

10. An electrooptical assembly comprising:

a radiometer capable of detecting radiant energy from multiple frequency bands that impinge upon an optical element, wherein said radiometer produces electrical output signals in response to said radiant energy received;

a radiant source for selectively producing radiant energy in said multiple frequency bands;

a detector for each of said multiple frequency bands for detecting radiant energy emitted by said radiant source in each of said multiple frequency bands; and directing means for directing said radiant energy onto said optical element in an unobstructed and unaltered manner, whereby said electrical output signal produced by said radiometer in response to said radiant energy are indicative of the accuracy of said radiometer as compared to a predetermined output expected for the radiant energy detected by each said detector.

11. The assembly according to claim 10, wherein said directing means includes a parabolic mirror that collimates the radiant energy directed onto said optical element of said radiometer.

12. The assembly according to claim 11, wherein said parabolic mirror is disposed proximate said optical element of said radiometer, thereby reducing vignetting of the radiant energy impinging upon the optical element.

13. The assembly according to claim 12, further including a selectively closable apparatus disposed between said parabolic mirror and optical element for selectively isolating said parabolic mirror from said optical element.

14. The assembly according to claim 11, wherein said directing means includes a flat mirror disposed over said parabolic mirror that directs the radiant energy from said radiant source to each said detector.

15. The assembly according to claim 10, wherein said radiant source includes at least one incandescent bulb.

16. A method of determining the performance of an electrooptical device that detects radiant energy from at least one bandwidth that impinges upon an optical element and produces electrical output signals corresponding to the radiant energy detected, comprising the steps of:

providing a radiant energy source capable of providing radiant energy in said at least one bandwidth;

selectively directing the radiant energy produced by said radiant energy source toward sad optical element;

selectively directing the radiant energy onto at least one detector that measures the radiant energy produced by said radiant energy source, whereby the radiant energy is received by said at least one detector in an unobstructed and unaltered manner; and comparing the electrical output signals produced by said electrooptical device to a predetermined output expected for the radiant energy measured, thereby determining the performance of said electrooptical device.

17. The method according to claim 16, further including the step of collimating the radiant energy directed toward said optical element from said radiant energy source.

18. The method according to claim 17, wherein said step of collimating includes reflecting said radiant energy off a parabolic mirror.

19. The method according to claim 18, further including the step of positioning said parabolic mirror proximate said optical element so as to reduce vignetting of the radiant energy impinging upon said optical element.

20. The method according to claim 16, wherein said electrooptical device detects multiple bandwidths of radiant energy and said method further includes the step of directing said multiple bandwidths of radiant energy to a plurality of detectors wherein each of said plurality of detectors measures the radiant energy contained within one bandwidth.

21. The method according to claim 16, wherein said radiant energy source includes at least one incandescent bulb disposed within an integrating sphere having a reflective inner surface, whereby radiant energy is created by said at least one incandescent bulb within said sphere and is emitted through an aperture in said sphere.

22. The method according to claim 21, further including the step of selectively filtering the radiant energy emitted by said radiant energy source.

* * * * *